US008096603B2

(12) United States Patent
Cassaday

(10) Patent No.: US 8,096,603 B2
(45) Date of Patent: Jan. 17, 2012

(54) PNEUMATIC DOOR ASSIST SYSTEM WITH HYDRAULIC LOCK

(75) Inventor: Nicholas M Cassaday, Woodburn, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 385 days.

(21) Appl. No.: 12/501,868

(22) Filed: Jul. 13, 2009

(65) Prior Publication Data

US 2010/0263280 A1 Oct. 21, 2010

(51) Int. Cl.

| | |
|---|---|
| ***B60J 5/04*** | (2006.01) |
| ***E05C 17/30*** | (2006.01) |
| ***E05F 3/12*** | (2006.01) |
| ***E05F 3/22*** | (2006.01) |
| ***E05F 15/04*** | (2006.01) |

(52) U.S. Cl. ........ 296/146.4; 16/66; 16/DIG. 7; 49/340; 49/358

(58) Field of Classification Search ......... 16/66, DIG. 7; 49/137, 139, 140, 322, 324, 339, 340, 344, 49/345, 358, 381, 394; 296/146.1, 146.4, 296/146.11, 146.12, 152
See application file for complete search history.

(56) References Cited

U.S. PATENT DOCUMENTS 1,819,213 A * 8/1931 Van Dorn ...................... 439/138
2,256,613 A * 9/1941 Forman et al. .................. 49/340
3,002,581 A 10/1961 Deibel
3,061,362 A * 10/1962 Maruyama ................ 296/146.4
3,124,344 A * 3/1964 Mano .............................. 49/280
3,773,385 A * 11/1973 Sandberg ............... 298/23 MD
4,689,849 A 9/1987 Eger
(Continued)

FOREIGN PATENT DOCUMENTS

FR 1280627 A 1/1962
(Continued)

OTHER PUBLICATIONS

PCT Search Report from corresponding application, application No. PCT/US2009/041073, dated Dec. 18, 2009, 9 pages.

*Primary Examiner* — Glenn Dayoan
*Assistant Examiner* — Paul Chenevert
(74) *Attorney, Agent, or Firm* — Jeffrey P. Calfa; Mark C. Bach

(57) ABSTRACT

A lock (57) for a door assist system (12) for use on a vehicle door (10) and connected to a vehicle to lock the door into an open position. The door assist system includes a door handle (40) having a first operable position, a second operable position and a released position, a pneumatic actuator (28) having an actuator rod (32), where the actuator rod is extendable when the door handle is in the first operable position and the actuator rod is retractable when the door handle is in the second operable position. The door assist system also includes a slide block (34) displaceable by the actuator rod of the pneumatic actuator. The slide block (34) also includes a door link (54) connecting the slide block (34) to the vehicle frame. As the slide block is displaced away from the pneumatic actuator (28), the door link opens the door (10) with respect to the vehicle. The lock also includes a hydraulic locking actuator (58) with a hydraulic rod (66) extendable and retractable with the slide block (34). When the door handle (40) is in the released position, the hydraulic rod (66) is prevented from extension and retraction and locks the slide block (34) at the current location, preventing opening or closing of the door (10).

20 Claims, 3 Drawing Sheets

U.S. PATENT DOCUMENTS

| | | | | |
|---|---|---|---|---|
| 5,468,042 | A * | 11/1995 | Heinrichs et al. | 296/146.4 |
| 6,189,265 | B1 | 2/2001 | Fink | |
| 6,382,706 | B2 * | 5/2002 | Yuge et al. | 296/146.4 |
| 6,550,831 | B2 | 4/2003 | Rizk | |
| 2004/0090083 | A1 * | 5/2004 | Greuel et al. | 296/146.4 |
| 2007/0001485 | A1 | 1/2007 | Jarolim | |
| 2008/0309118 | A1 * | 12/2008 | Kohlstrand | 296/146.1 |

FOREIGN PATENT DOCUMENTS

| | | |
|---|---|---|
| GB | 2450980 A | 1/2009 |

* cited by examiner

PNEUMATIC DOOR ASSIST SYSTEM WITH HYDRAULIC LOCK

BACKGROUND

Embodiments disclosed herein relate to automotive doors, and more particularly, to door opening assist devices for use on automobile doors that lock the position of the door in an open position.

Doors in trucks and other vehicles, particularly military or other armored vehicles, can be very heavy. Depending on the angle that the vehicle is at, these heavy doors can move from an open position to a closed position without the operator pushing or pulling the door closed. With the tendency of these heavy doors to close on their own, the operator can experience difficulties with ingress and egress of the vehicle. Additionally, the operator may not have both hands available to support the door in the open position during ingress and egress.

Door assist systems are used to open and close doors without the need for the operator to exert significant effort in holding or supporting the door. Door assist systems also avoid the possibility of the door closing on its own and striking the operator passing through the door frame. Further, door assist systems avoid or lessen impacts upon closing, and minimize damage to the hinges and the latches. Typically, door assist systems use electrically operated solenoids and linear actuators that require electrical power to operate.

SUMMARY

A door assist system for use on a vehicle door being connected to a vehicle to lock the door into an open position includes a door handle having a first operable position, a second operable position and a released position. The door assist system also includes a pneumatic actuator having an actuator rod, where the actuator rod is extendable when the door handle is in the first operable position and the actuator rod is retractable when the door handle is in the second operable position. A slide block is displaceable by the actuator rod of the pneumatic actuator. A lock includes a door link connecting the slide block to the vehicle frame. As the slide block is displaced away from the pneumatic actuator, the door link opens the door with respect to the vehicle. The lock also includes a hydraulic locking actuator with a hydraulic rod extendable and retractable with the slide block. When the door handle is in the released position, the actuator rod is prevented from extension and retraction and locks the slide block at the current location, preventing opening or closing of the door.

DETAILED DESCRIPTION

Figure 1:
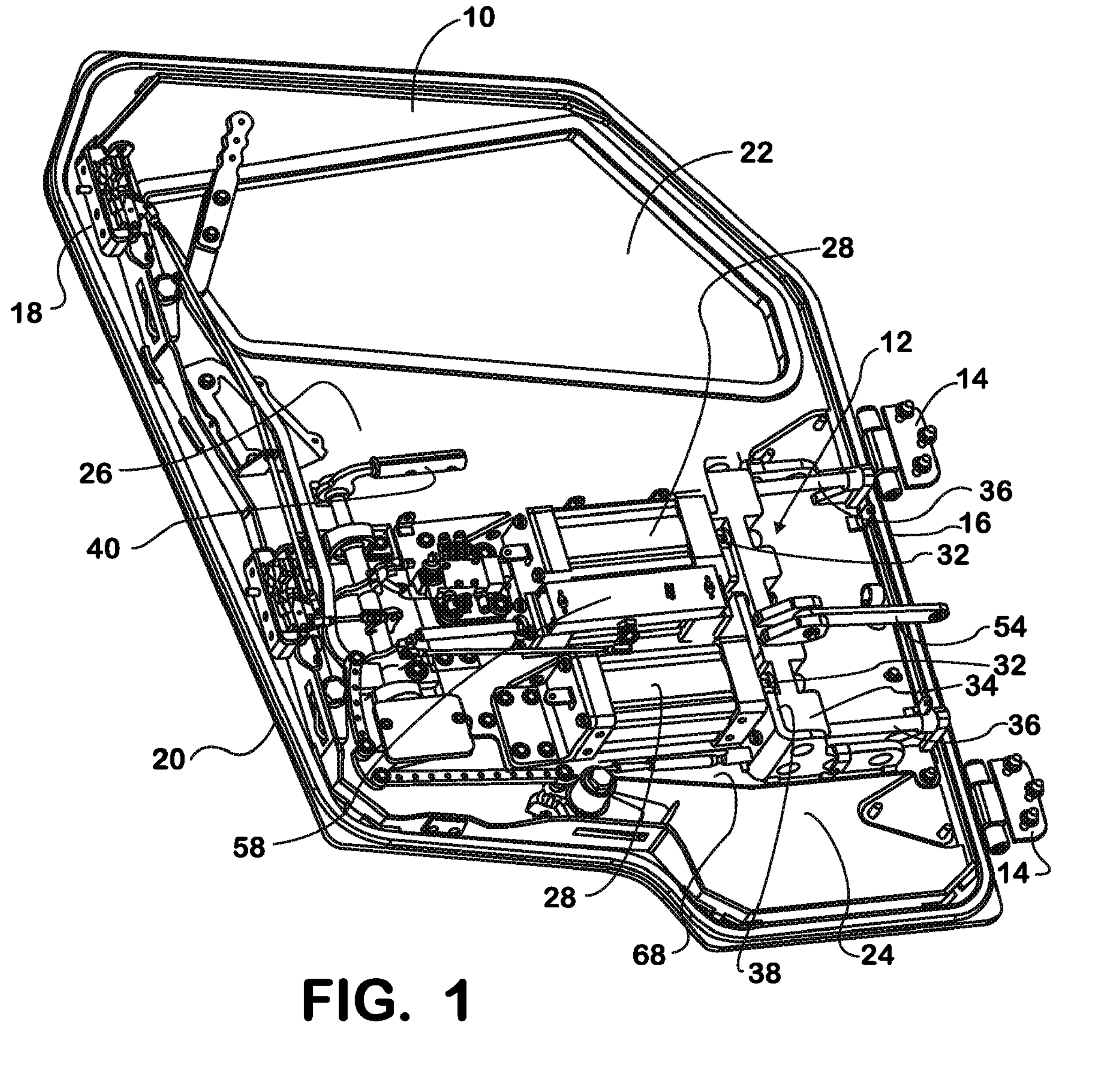
FIG. 1 is a perspective view of a vehicle door having the pneumatic door assist system and a hydraulic locking actuator.
Figure 2:
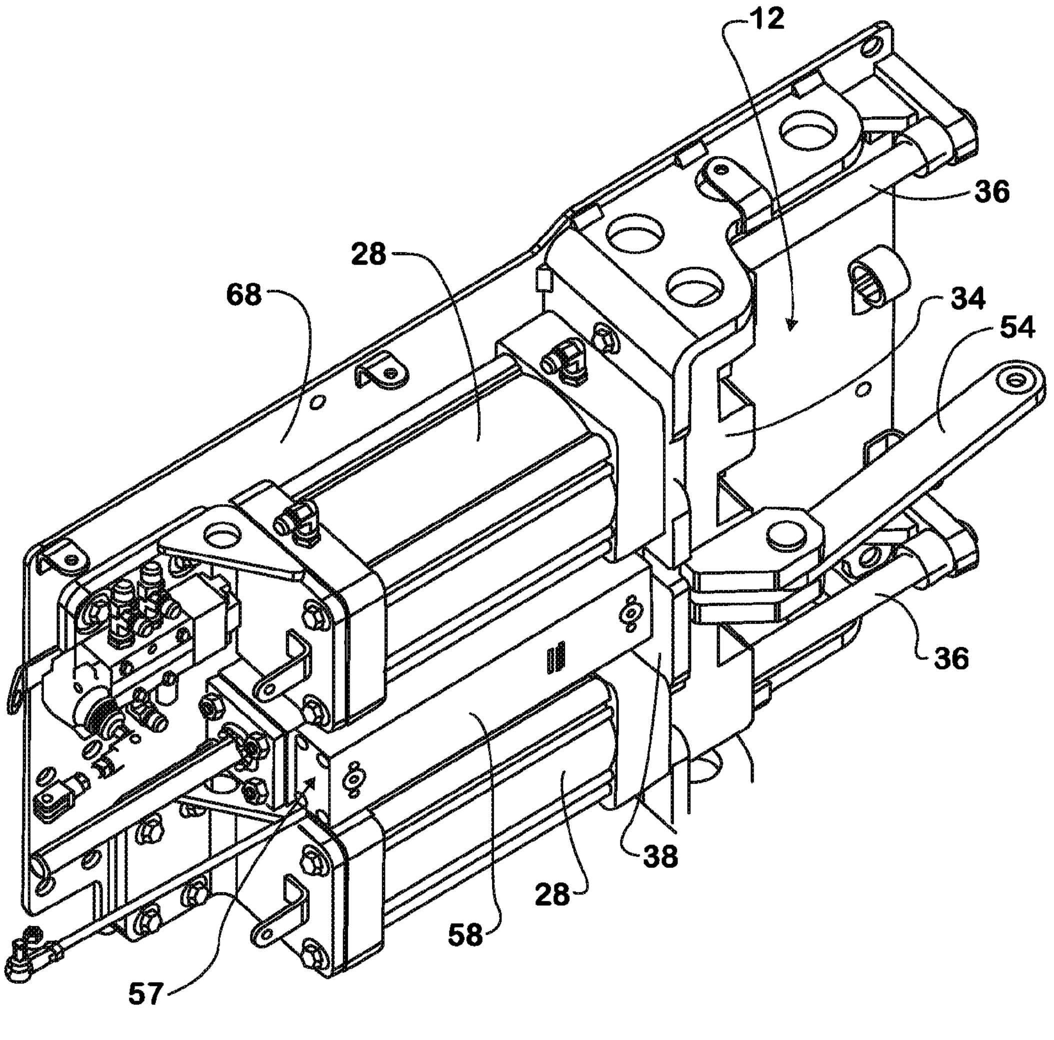
FIG. 2 is a perspective view of the pneumatic door assist system and the hydraulic locking actuator of FIG. 1.
Figure 3:
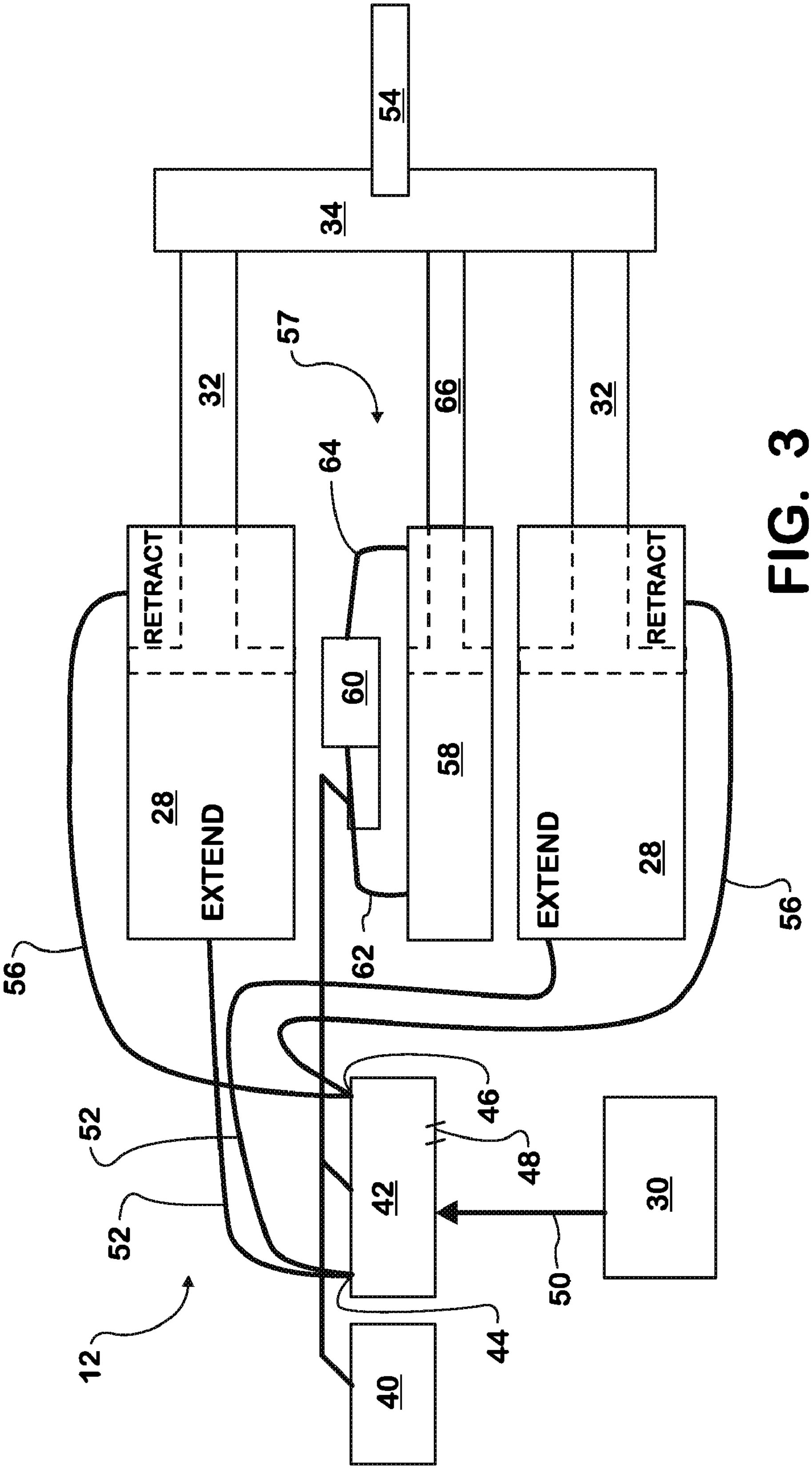
FIG. 3 is a schematic of the pneumatic door assist system and the hydraulic locking actuator in an extended position.

Referring to FIGS. 1-3, a vehicle door is indicated generally at 10, and includes a door assist system 12 that opens and closes the door with limited operator effort, and maintains the door in any open position without the need for the operator to hold or support the door in the open position. While the present door assist system 12 will be described with respect to a military or armored vehicle door, it is contemplated that the present door assist system can be incorporated in any door that has a tendency to close or needs to maintain an open position.

The door 10 has hinges 14 located at an inside edge 16 of the door that attach the door to the vehicle frame (not shown). The hinges 14 connect to the vehicle door frame. A latching system 18 is located on the door 10 at an outside edge 20 of the door, opposite from the hinges 14. The door 10 may also include a window portion 22 and a component portion 24, the portion of the door where the components of the door assist system 12 are located. The door 10 also includes a panel 26 upon which the components of the door assist system 12 are mounted.

The door assist system 12 has two pneumatic actuators 28 that are operated by the vehicle's on-board air system 30, for example the compressor or air tanks. In this configuration, the door assist system 12 is actuated pneumatically and without the need for electronic actuation. Since the door assist system 12 is mechanically operated, if there is a failure of the vehicle's electronic system, or if the electronic system of the vehicle is turned off, such as after parking the vehicle, the pneumatic door assist system 12 remains operable.

Each pneumatic actuator 28 is mounted to the door 10 and has an actuator rod 32 that extends and retracts. The actuator rod 32 is attached to a slide block 34 that is moveable with respect to the door 10. The slide block 34 is generally elongate and oriented to be generally perpendicular to the actuator rods 32. The slide block 34 is configured to slide on two positioning rods 36 that extend through the slide block 34 from a location at or near the inside edge 16 of the door 10, to a slide block receiving structure 38 adjacent the pneumatic actuators 28. When the actuator rod 32 is extended, the actuator rod displaces the slide block 34 away from the pneumatic actuator 28, and when the actuator rod is retracted, the actuator rod displaces the slide block towards the pneumatic actuator. Displacement of the slide block 34 is limited by the length of the actuator rods 32 in the extended position, and the slide block receiving structure 38 in the retracted position.

A door handle 40 has a first operable position and a second operable position. For purposes of this application, the positions will be referred to as a "push position" and a "pull position", although other positions for varying types of door handles 40 are contemplated. During all opening and closing movements of the door 10, the door handle 40 is either in a push position or a pull position operational state. When the door handle 40 is released by the operator, in neither the push position nor the pull position, no movement of the door 10 is permitted, due to the lock and the hydraulic locking actuator which will be discussed below.

The door handle 40 is attached to the door 10 and mechanically operates an air valve 42. The air valve 42 has at least two output ports 44, 46 and at least one exhaust port 48. Operation of the door handle 40 into the push position opens an air valve 42 which allows air (or other gaseous fluids) to travel from the air system 30, such as the compressor or air tanks, through first air delivery lines 50, through the air valve 42 and out the first output port 44. From the first output port 44, the air flows through first air input lines 52 to the pneumatic actuator(s) 28. Air received in the pneumatic actuator(s) 28 extends the actuator rod 32 away from the pneumatic actuator and towards the door hinges 14. Thus, extension of the actuator rod 32 occurs when the door handle 40 is in the push position, although it is contemplated that extension of the actuator rod 32 can occur when the door handle is moved to any first operable position.

A door link 54 provides a linkage between the slide block 34 located on the door 10 and the vehicle frame (not shown). The door link 54 is pivotable on the slide block 34. When the slide block 34 is extended away from the pneumatic actuator 28, the door link 54 acts against the vehicle frame(not shown) to pivot the door 10 open. Thus, the pneumatic actuator 28, with air supplied by the air supply 30 and triggered by the door handle 40, allows the door 10 to be opened with limited human effort.

The pneumatic actuator 28 also allows the door 10 to be closed with limited human effort. When the door handle 40 is moved to the second operational position or pull position, the air valve 42 opens and allows air to flow from the air supply 30 to the air valve. The air valve 42 has bidirectional control to its first output port 44 and its second output port 46. In contrast to the push position of the door handle where air flows through the first output port 44, in the pull position air travels from the air valve 42 through the second output port 46 and the second air input lines 56 to the rod side of the pneumatic actuator 28.

Air received at the rod side retracts the actuator rod 34 and pulls the slide block 34 towards the pneumatic actuator 28. Air on the opposite side in the pneumatic actuator 28 is vented through the exhaust port 48 in the air valve 42. When the slide block 34 is retracted towards the pneumatic actuator 28, the door link 54 pivots the door 10 to a closed position.

A lock 57 includes a hydraulic locking actuator 58 that is located on the door 10 and which is generally parallel with the pneumatic actuators 28. The hydraulic locking actuator 58 locks the door 10 at any open, stopped position by locking the slide block 34 in place with respect to the door 10 to prevent the door closing on the operator during ingress and egress. It is contemplated that the lock 57 is not limited to a hydraulic locking actuator 58, but can be any other kind of actuator.

The door handle 40 also operates a hydraulic valve 60. When the door handle 40 is in either the push or the pull operational state, the hydraulic valve 60 is opened to permit the extension and retraction of the hydraulic locking actuator 58. The hydraulic valve 60 is fluidly connected to the hydraulic locking actuator 58 with a first fluid input line 62 and a second fluid input line 64. No separate input system is needed for operation of the hydraulic locking actuator 58.

The slide block 34, which is displaced by the pneumatic actuators 28, in turn operates the hydraulic locking actuator 58. As long as the door handle 40 is in either the push or the pull operational state, the hydraulic valve 60 is opened, and a hydraulic rod 66 is extendable and retractable. The slide block 34 extends or retracts the hydraulic rod 66 as long as the hydraulic valve 60 is open.

When the door handle 40 is released, the hydraulic valve 60 closes, which locks the hydraulic locking actuator 58. When the hydraulic valve 60 closes, the hydraulic fluid cannot pass through the hydraulic valve to allow the extension and retraction of the hydraulic rod 66. In this state, the hydraulic rod 66 is static, thus the slide block 34 is also static. Since the slide block 34 is not movable, the door link 54 is also static and locks the door 10 into the position that the door is in when the door handle 40 is released.

In the event that there is a failure of the pneumatic actuators 28, the air supply 30 or any other portion of the pneumatic system, the hydraulic locking actuator 58 is still operable. That is, even if pushing or pulling on the door handle 40 does not result in the pneumatic actuators 28 assisting in the opening and closing motion of the door 10, the pushing position or the pulling position on the door handle 40 will open the hydraulic valve 60 to allow the hydraulic locking actuator 58 to operate.

In the event of failure of the pneumatic system, the door 10 can be manually opened or closed by the operator without pneumatic assist, manually moving the door handle 40 which will then open the air valve 40, and the hydraulic valve 60 which unlocks the slide block 34, allowing the door to be manually opened. Concurrently or soon after the door handle 40 is released, the hydraulic valve 60 will close, and the hydraulic locking actuator 58 will lock the door 10 into the current position, irrespective of the functioning of the pneumatic system.

The pneumatic actuators 28, the hydraulic locking actuator 58 and the slide block 34 are mounted on a door assist plate 68 that is attached to the door panel 26 at the component portion 24 of the door 10. It is contemplated that different numbers of pneumatic actuators 28 and hydraulic actuators 58 can be used.

What is claimed is:

1. A door assist system for use on a vehicle door and connected to a vehicle to provide assisted opening, closing and locking of the door, the door assist system comprising:
- a door handle having a first operable position, a second operable position and a released position;
- at least one pneumatic actuator having an actuator rod, wherein the actuator rod is extendable when the door handle is in the first operable position, and the actuator rod is retractable when the door handle is in the second operable position;
- a slide block displaceable by the actuator rod of the pneumatic actuator;
- a door link connecting the slide block to the vehicle frame, wherein as the slide block is displaced away from the pneumatic actuator, the door link opens the door with respect to the vehicle; and
- a lock having a lock rod extendable and retractable with the slide block, wherein when the door handle is in the released position, the lock rod is prevented from extension and retraction and locks the slide block.

2. The door assist system of claim 1 wherein air for the pneumatic actuator is supplied from an on-board air supply of the vehicle.

3. The door assist system of claim 1 wherein the lock is a hydraulic actuator.

4. The door assist system of claim 1 wherein the door handle opens an air valve in the first operable position and in the second operable position, which permits flow of air or other fluid from an on-board air supply to the at least one pneumatic actuator.

5. The door assist system of claim 1 wherein the door handle closes an air valve in the released position, which prevents the flow of air or other fluid from an on-board air supply to the at least one pneumatic actuator.

6. The door assist system of claim 1 wherein the door handle opens a hydraulic valve in the first operable position and in the second operable position, which permits the flow of fluid through the hydraulic valve to the hydraulic actuator.

7. The door assist system of claim 4 wherein when the air valve is opened, air is exhausted from the pneumatic actuator.

8. The door assist system of claim 3 wherein the hydraulic locking actuator is disposed between and parallel to two pneumatic air actuators.

9. The door assist system of claim 1 wherein the slide block is disposed generally transverse to the at least one pneumatic actuator and is configured to slide on a positioning rod.

10. A lock for a door assist system for use on a vehicle door and connected to a vehicle to lock the door into an open position or a closed position, the door having a door handle having a first operable position, a second operable position and a released position, a pneumatic actuator having an actuator rod, wherein the actuator rod is extendable when the door handle is in the first operable position, and the actuator rod is retractable when the door handle is in the second operable position, the lock comprising:

a slide block displaceable by the actuator rod of the pneumatic actuator;

a door link connecting the slide block to the vehicle frame, wherein as the slide block is displaced away from the pneumatic actuator, the door link opens the door with respect to the vehicle;

a hydraulic locking actuator having a hydraulic rod extendable and retractable with the slide block, wherein when the door handle is in the released position, the hydraulic rod is prevented from extension and retraction and locks the slide block preventing opening and closing of the door.

11. The lock of claim 10 wherein the hydraulic rod is generally parallel with the actuator rod.

12. The lock of claim 10 further comprising a hydraulic valve that is opened when the door handle is in the first operable position and the second operable position, and is closed when the door handle is in the released position.

13. A door assist system for use on a vehicle door and connected to a vehicle to provide assisted opening, closing and locking of the door into an open position or a closed position, the door assist comprising:

a door handle having a first operable position, a second operable position and a released position, wherein the door handle opens an air valve and a hydraulic valve when the door handle is in the first operable position and the second operable position;

at least one pneumatic actuator having an actuator rod, wherein the actuator rod is extendable when the door handle is in the first operable position, and the actuator rod is retractable when the door handle is in the second operable position;

a slide block disposed generally transversely to the actuator rod and displaceable by the actuator rod;

a door link connecting the slide block to the vehicle frame, wherein as the slide block is displaced away from the pneumatic actuator, the door link opens the door with respect to the vehicle; and a hydraulic locking actuator having a hydraulic rod extendable and retractable with the slide block when the hydraulic valve is open, and wherein the hydraulic rod is prevented from extending and retracting with the hydraulic valve is closed.

14. The door assist system of claim 13 further comprising an air delivery line for delivering air to the air valve, and a first air input line from the air valve to the pneumatic actuator, and a second air input line from the air valve to the pneumatic actuator.

15. The door assist system of claim 14 wherein when the door handle is in the first operable position, the air valve allows air through the first air input line, and when the door handle is in the second operable position, the air valve allows air through the second air input line.

16. The door assist system of claim 13 wherein the air is supplied from an on-board air supply of the vehicle.

17. The door assist system of claim 13 wherein when the air valve is opened, air is exhausted from the pneumatic actuator.

18. The door assist system of claim 13 wherein the slide block is disposed generally transverse to the at least one pneumatic actuator and is configured to slide on a positioning rod.

19. The door assist system of claim 13 wherein the hydraulic locking actuator is disposed between and parallel to two pneumatic air actuators.

20. The door assist system of claim 13 wherein the door link is pivotable on the slide block.

* * * * *